US011048452B2

(12) United States Patent
Sato

(10) Patent No.: US 11,048,452 B2
(45) Date of Patent: Jun. 29, 2021

(54) INFORMATION PROCESSING APPARATUS, CONTROL METHOD, AND STORAGE MEDIUM FOR DETERMINING IP ADDRESSES ARE OVERLAPE IN DIRECT AND INFRASTRUCTURE MODES, THE INFORMATION PROCESSING APPARATUS PROHIBITS TO OPERATE IN DIRECT CONNECTION MODE

(71) Applicant: CANON KABUSHIKI KAISHA, Tokyo (JP)

(72) Inventor: Haruki Sato, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/920,976

(22) Filed: Mar. 14, 2018

(65) Prior Publication Data

US 2018/0267751 A1   Sep. 20, 2018

(30) Foreign Application Priority Data

Mar. 16, 2017   (JP) .............................. JP2017-051075

(51) Int. Cl.
```
G06F 3/12       (2006.01)
H04W 76/14      (2018.01)
H04L 29/12      (2006.01)
H04W 4/80       (2018.01)
H04N 1/00       (2006.01)
H04W 48/00      (2009.01)
```
(52) U.S. Cl.
CPC .......... *G06F 3/1231* (2013.01); *G06F 3/1209* (2013.01); *H04L 61/106* (2013.01); *H04W 4/80* (2018.02); *H04W 76/14* (2018.02); *H04L 61/2007* (2013.01); *H04L 61/2046* (2013.01); *H04N 1/00413* (2013.01); *H04W 48/00* (2013.01)

(58) Field of Classification Search
None
See application file for complete search history.

(56) References Cited

U.S. PATENT DOCUMENTS

| 9,117,164 B2* | 8/2015 | Park ..................... G06K 15/405 |
| 2009/0051956 A1* | 2/2009 | Kondo ..................... G06F 21/34 |
| | | 358/1.13 |
| 2011/0122434 A1* | 5/2011 | Kim ..................... G06F 3/1203 |
| | | 358/1.15 |

(Continued)

FOREIGN PATENT DOCUMENTS

| CN | 103873136 A | 6/2014 |
| CN | 104423452 A | 3/2015 |

(Continued)

*Primary Examiner* — Haris Sabah
(74) *Attorney, Agent, or Firm* — Canon U.S.A., Inc., IP Division

(57) ABSTRACT

When an IP address for use in an infrastructure connection mode and an IP address for use in a direct connection mode overlap each other, there is a possibility that an information processing apparatus incorrectly transmits data to an interface different from an interface supposed to receive the data. Thus, the information processing apparatus is prohibited from operating in the direct connection mode in a case where the IP address for use in the infrastructure connection mode and the IP address for use in the direct connection mode overlap each other.

9 Claims, 11 Drawing Sheets

(56) References Cited

U.S. PATENT DOCUMENTS

| | | | | |
|---|---|---|---|---|
| 2012/0127523 A1* | 5/2012 | Terashita | | G06F 3/1285 358/1.15 |
| 2013/0250358 A1* | 9/2013 | Suzuki | | H04L 67/14 358/1.15 |
| 2014/0085666 A1* | 3/2014 | Park | | G06K 15/405 358/1.15 |
| 2014/0168681 A1* | 6/2014 | Nakamura | | G06F 3/1286 358/1.13 |
| 2014/0268221 A1* | 9/2014 | Sako | | H04N 1/00204 358/1.15 |
| 2015/0060547 A1* | 3/2015 | Nagasawa | | G06F 3/1292 235/454 |
| 2015/0195161 A1* | 7/2015 | Tanji | | H04L 61/2046 709/224 |
| 2016/0054962 A1* | 2/2016 | Park | | G06F 3/1236 358/1.15 |
| 2016/0253134 A1* | 9/2016 | Nakai | | H04L 61/6059 358/1.15 |
| 2016/0313953 A1* | 10/2016 | Ooba | | H04N 1/00347 |
| 2017/0264758 A1* | 9/2017 | Naito | | H04L 51/22 |
| 2017/0339734 A1* | 11/2017 | Sambe | | H04W 76/15 |

FOREIGN PATENT DOCUMENTS

| | | |
|---|---|---|
| CN | 104427173 A | 3/2015 |
| CN | 104471962 A | 3/2015 |
| CN | 104662996 A | 5/2015 |
| CN | 104754168 A | 7/2015 |
| CN | 105278892 A | 1/2016 |
| CN | 106067929 A | 11/2016 |
| JP | 2014-179798 | 9/2014 |
| JP | 2015-130579 A | 7/2015 |
| JP | 2016107573 A | 6/2016 |
| KR | 10-2013-0066553 A | 6/2013 |

* cited by examiner

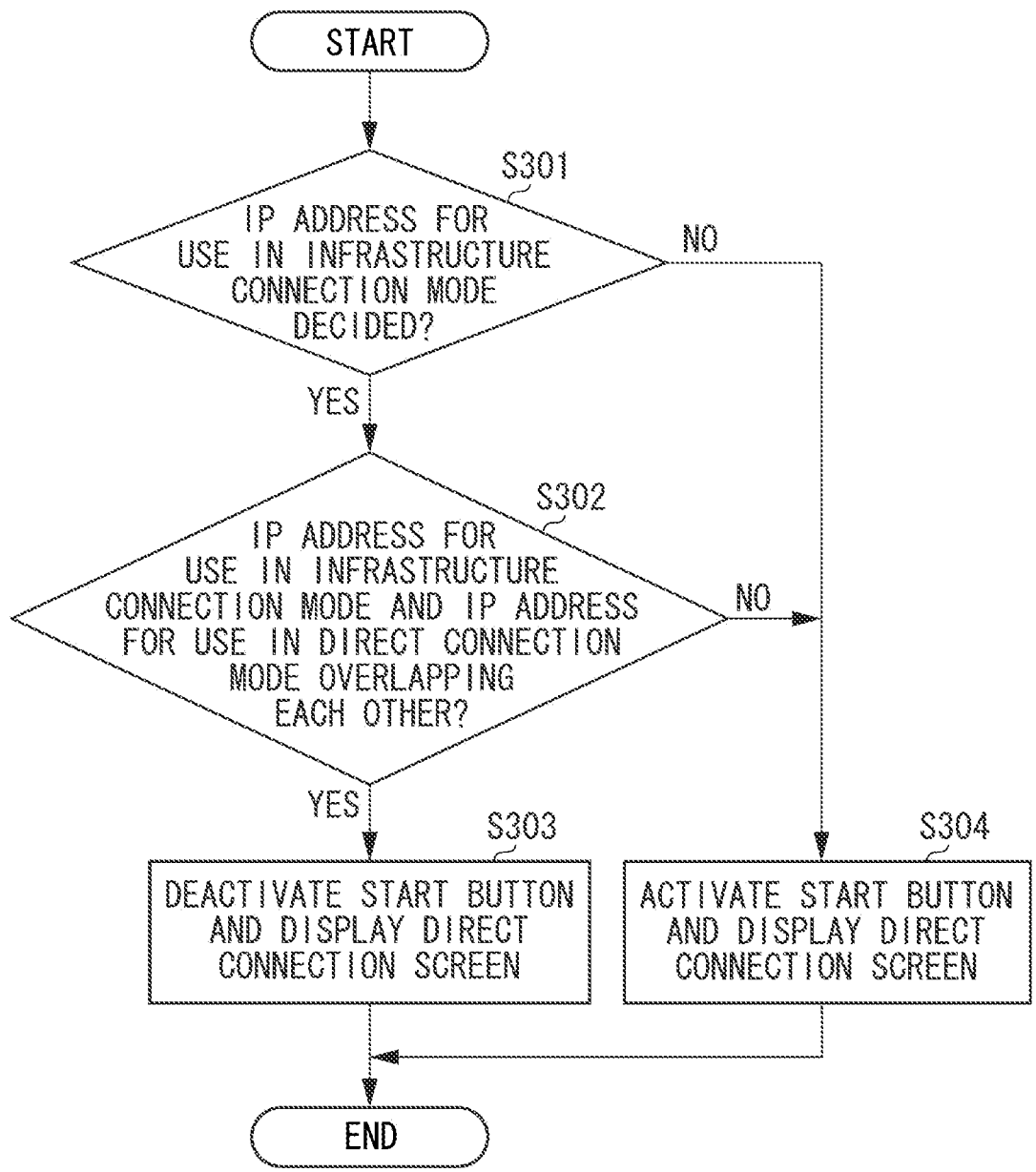

400 MENU SCREEN

410 DIRECT CONNECTION SCREEN

420 DIRECT CONNECTION SCREEN

430 DIRECT CONNECTION SCREEN

440 DIRECT CONNECTION SCREEN

450 MENU SCREEN

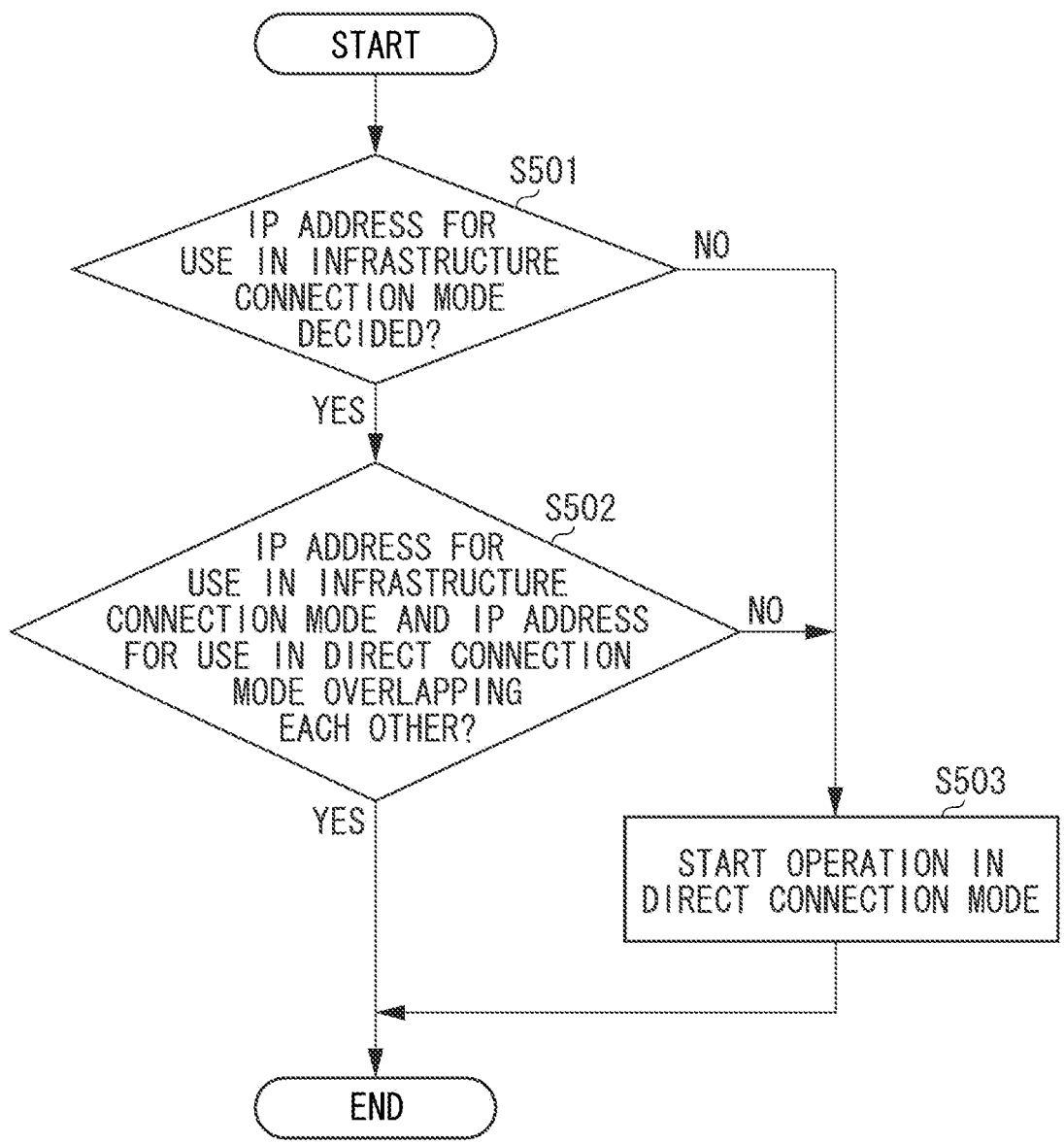

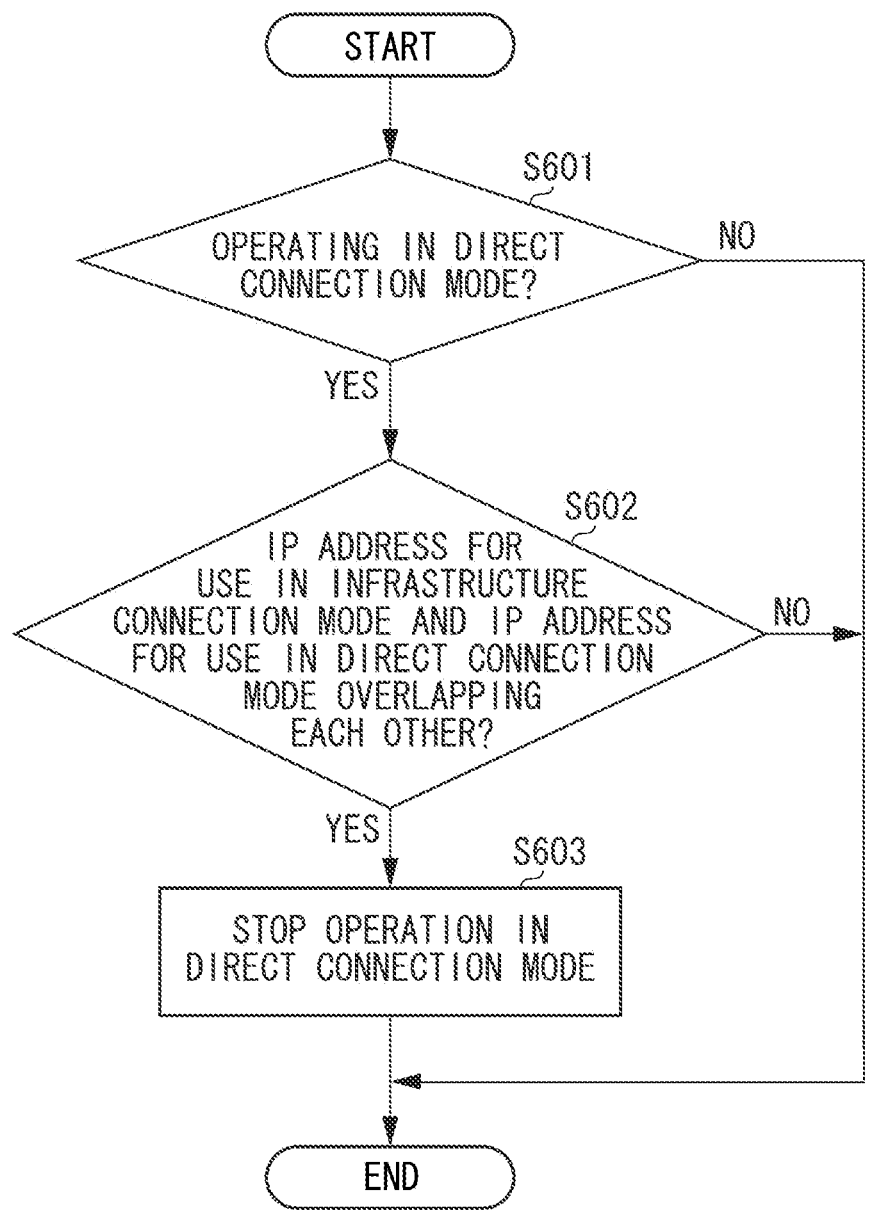

800 MENU SCREEN

810 DIRECT CONNECTION SCREEN

820 DIRECT CONNECTION SCREEN

830 ERROR SCREEN

INFORMATION PROCESSING APPARATUS, CONTROL METHOD, AND STORAGE MEDIUM FOR DETERMINING IP ADDRESSES ARE OVERLAPE IN DIRECT AND INFRASTRUCTURE MODES, THE INFORMATION PROCESSING APPARATUS PROHIBITS TO OPERATE IN DIRECT CONNECTION MODE

BACKGROUND

Field

The present disclosure relates to an information processing apparatus, a control method, and a storage medium.

Description of the Related Art

An information processing apparatus, such as a printing apparatus or a digital camera, includes a direct connection mode for performing direct wireless connection between a mobile terminal and the information processing apparatus. An access point mode, in which the information processing apparatus serves as an access point, and Wi-Fi Direct® are each known as the direct connection mode. Japanese Patent Application Laid-Open No. 2014-179798 discusses a printing apparatus that executes Wi-Fi Direct®. The printing apparatus of Japanese Patent Application Laid-Open No. 2014-179798 automatically sets an address of a mobile terminal wirelessly connected to the printing apparatus by Wi-Fi Direct®, as a destination of a SEND function.

The information processing apparatus also includes an infrastructure connection mode for connection to an infrastructure network, separately from the direct connection mode. A wired local area network (LAN) mode or an infrastructure mode of a wireless LAN corresponds to the infrastructure connection mode.

In a case where the information processing apparatus operates in the direct connection mode and the infrastructure connection mode simultaneously, there is a possibility that an Internet Protocol (IP) address for use in the direct connection mode and an IP address for use in the infrastructure connection mode overlap each other. When such an overlap between the IP addresses occurs, the information processing apparatus cannot appropriately determine which one of an interface of the infrastructure connection mode and an interface of the direct connection mode is a destination of data transmission. This can cause the information processing apparatus to incorrectly transmit data to an interface different from an interface supposed to receive the data.

SUMMARY

According to an aspect of the present disclosure, an information processing apparatus that operates in an infrastructure connection mode and a direct connection mode includes a determination unit configured to determine whether a first Internet Protocol (IP) address for use in the infrastructure connection mode and a second IP address for use in the direct connection mode overlap each other, and a control unit configured to, in a case where the determination unit determines that the first IP address and the second IP address overlap each other, prohibit the information processing apparatus from operating in the direct connection mode.

Further features of the present disclosure will become apparent from the following description of exemplary embodiments with reference to the attached drawings.

BRIEF DESCRIPTION OF THE DRAWINGS

FIG. 3 is a flowchart illustrating processing to be executed by the printing apparatus.

FIG. 5 is a flowchart illustrating processing to be executed by the printing apparatus.

FIG. 6 is a flowchart illustrating processing to be executed by the printing apparatus.

DESCRIPTION OF THE EMBODIMENTS

Exemplary embodiments will be described in detail below with reference to the drawings. The following exemplary embodiments are not intended to be limiting, and not all combinations of features described in the exemplary embodiments are essential to a solution of the invention.

Figure 1:
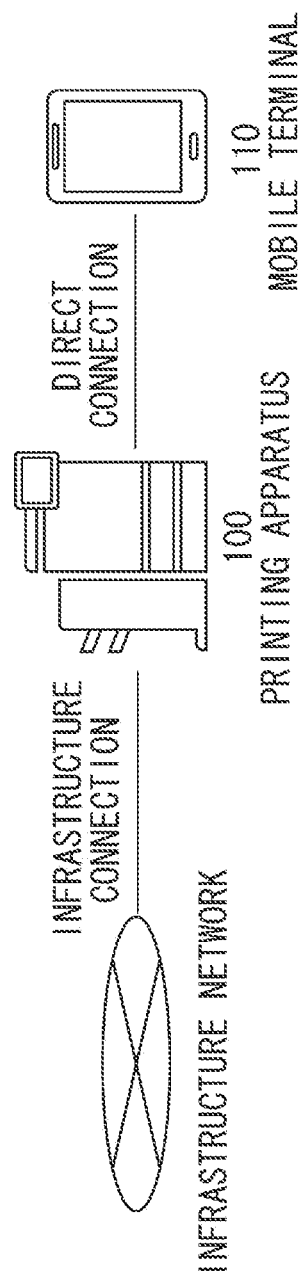
FIG. 1 is a diagram illustrating an overall image of a system.

An overall image of a system will be described with reference to FIG. 1. A printing apparatus 100 according to a first exemplary embodiment operates in an infrastructure connection mode and a direct connection mode. The infrastructure connection mode is a mode for performing communication by connecting to an infrastructure network. The infrastructure connection mode corresponds to a wired local area network (LAN) mode, and an infrastructure mode of a wireless LAN. When the printing apparatus 100 operates in the infrastructure mode, the printing apparatus 100 wirelessly connects to an access point (not illustrated). The direct connection mode is a mode for performing direct wireless connection between a mobile terminal 110 and the printing apparatus 100. An access point mode, in which an information processing apparatus serves as an access point, and Wi-Fi Direct® are each known as the direct connection mode. In the following description, the direct connection mode refers to the access point mode, but Wi-Fi Direct® can be applied in place of the access point mode.

Figure 2:
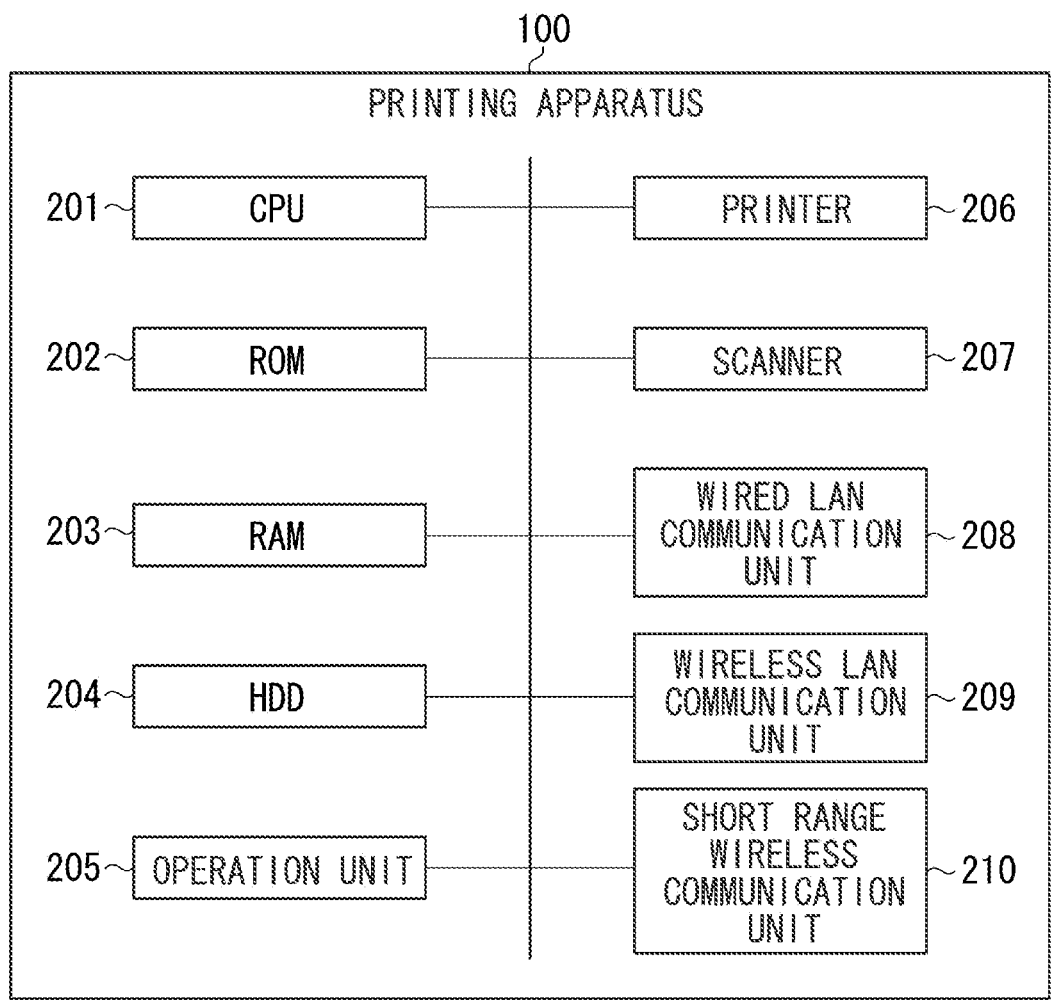
FIG. 2 is a diagram illustrating a hardware configuration of a printing apparatus.

Next, a hardware configuration of the printing apparatus 100 will be described with reference to FIG. 2. A central processing unit (CPU) 201 executes various kinds of processing for controlling operations of the printing apparatus 100 by reading out a control program stored in a read only memory (ROM) 202. The ROM 202 stores the control program. A random access memory (RAM) 203 is used as a temporary storage area, such as a main memory of the CPU 201, and a work area. A hard disk drive (HDD) 204 is a nonvolatile storage medium for storing various data. In the printing apparatus 100 of the present exemplary embodiment, the one CPU 201 executes each process illustrated in the flowcharts described below, but other modes can be adopted. For example, a plurality of CPUs can execute each process illustrated in the below-described flowcharts in cooperation with each other. Processing of each below-described flowchart can be partially executed using a hardware circuit such as an application-specific integrated circuit (ASIC).

An operation unit 205 includes a display with a touch panel function and a keyboard, and displays various operation screens. A user can input an instruction and information into the printing apparatus 100 via the operation unit 205. A printer 206 executes print processing on a sheet. A scanner 207 reads an original document placed by the user, and then generates an original document image. The original document image generated by the scanner 207 is printed by the printer 206 or stored into the HDD 204.

A wired LAN communication unit 208 communicates with an external apparatus on the infrastructure network, via a LAN cable.

A wireless LAN communication unit 209 executes wireless LAN communication based on a standard such as the Institute of Electrical and Electronics Engineers (IEEE) 802.11a/b/g/n/ac. The wireless LAN communication unit 209 connects to an access point, and thereby executes the wireless LAN communication with the external apparatus on the infrastructure network. Such a mode, in which the wireless LAN communication unit 209 connects to the access point and thereby executes the wireless LAN communication, is referred to as the infrastructure mode. In a case where the printing apparatus 100 operates in the direct connection mode, the wireless LAN communication unit 209 executes wireless communication with a terminal (e.g., the mobile terminal 110) wirelessly connected to the printing apparatus 100.

A short range wireless communication unit 210 executes short-range wireless communication based on Bluetooth®.

In the following description, a mode in which the wired LAN communication unit 208 communicates with the external apparatus on the infrastructure network, and a mode in which the wireless LAN communication unit 209 communicates in the infrastructure mode will each be referred to as the infrastructure connection mode.

The printing apparatus 100 of the present exemplary embodiment includes a characteristic of not starting operation in the direct connection mode in a case where an IP address for use in the infrastructure connection mode and an IP address for use in the direct connection mode overlap each other. This characteristic will be described in detail with reference to FIG. 3 and FIGS. 4A to 4F.

Figure 4A:
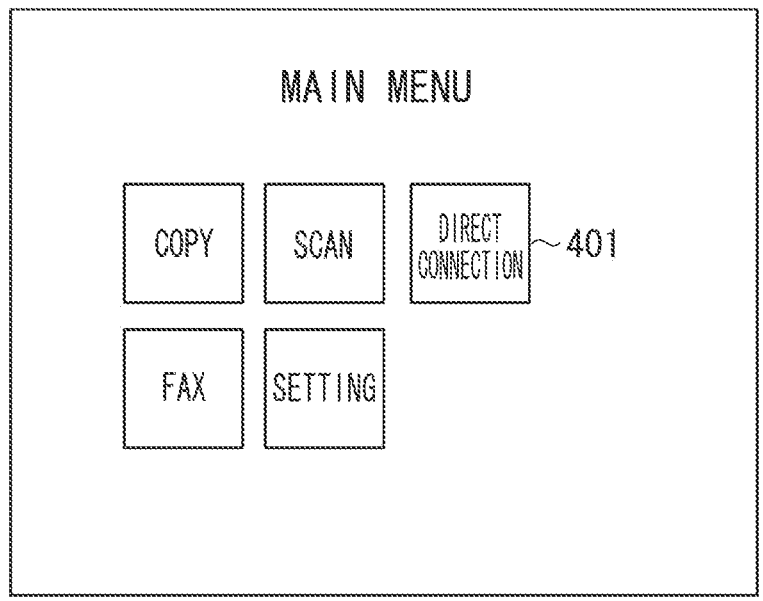
FIGS. 4A to 4F are diagrams each illustrating a screen to be displayed by the printing apparatus.
Figure 4B:
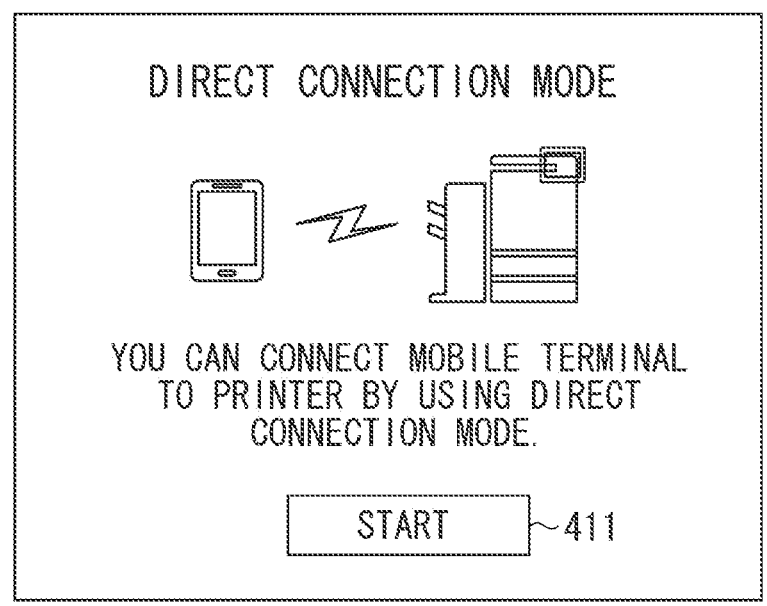
Figure 4C:
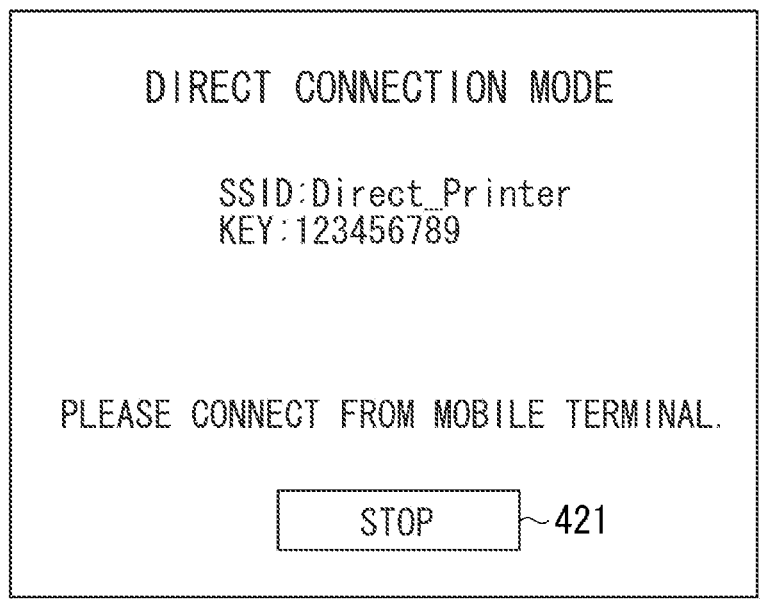
Figure 4D:
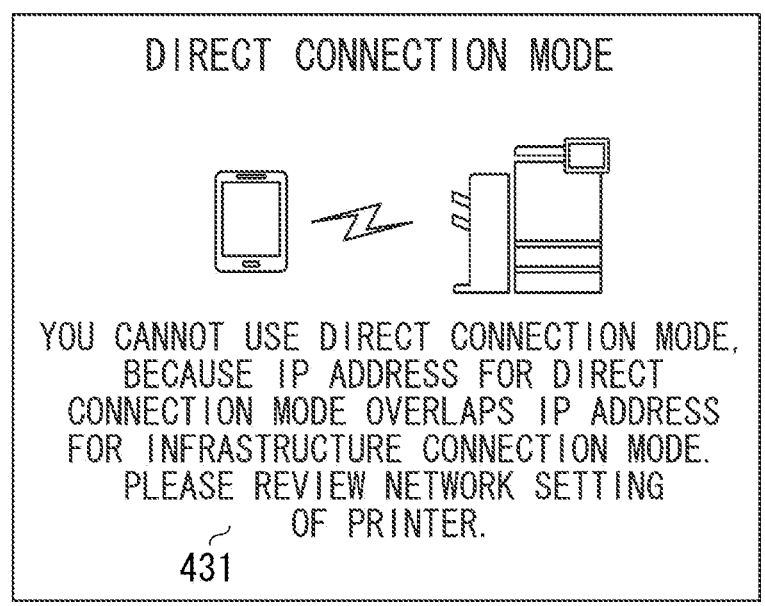

A menu screen 400 illustrated in FIG. 4A is a screen displayed by the operation unit 205 of the printing apparatus 100. The menu screen 400 is a screen the user uses to select a desired function from a plurality of functions of the printing apparatus 100, such as a copy function and a scan function. For example, presume the user wishes to connect the user's mobile terminal to the printing apparatus 100 using the direct connection mode. In this case, the user presses an icon 401 on the menu screen 400. When the user presses the icon 401, the operation unit 205 displays a direct connection screen 410 illustrated in FIG. 4B.

The direct connection screen 410 includes a start button 411. The start button 411 is a button enabling the user to instruct the printing apparatus 100 to start to operate in the direct connection mode. When the user presses the start button 411, the printing apparatus 100 starts to operate in the direct connection mode, and the operation unit 205 of the printing apparatus 100 displays a direct connection screen 420 illustrated in FIG. 4C.

A service set identifier (SSID) and a connection key are displayed on the direct connection screen 420 as information necessary for wirelessly connecting the user's mobile terminal to the printing apparatus 100. The user wirelessly connects the user's mobile terminal to the printing apparatus 100 by using the SSID and the connection key. The direct connection screen 420 includes a stop button 421 enabling the user to instruct the printing apparatus 100 to stop operating in the direct connection mode. When the stop button 421 is pressed, the printing apparatus 100 stops operating in the direct connection mode.

Processing to be executed by the printing apparatus 100 will be described with reference to the flowchart in FIG. 3. The CPU 201 loads a control program stored in the ROM 202 into the RAM 203, and executes the loaded control program, thereby performing steps in the flowchart illustrated in FIG. 3. When the user presses the icon 401, the processing of the flowchart in FIG. 3 is executed.

First, in step S301, the CPU 201 determines whether the IP address for use in the infrastructure connection mode is decided. In a case where the wired LAN communication unit 208 communicates with the external apparatus on the infrastructure network, the IP address for use in the infrastructure connection mode indicates an IP address assigned to the wired LAN communication unit 208. In a case where the wireless LAN communication unit 209 operates in the infrastructure mode, the IP address for use in the infrastructure connection mode indicates an IP address to be used by the wireless LAN communication unit 209 in the infrastructure mode. If the CPU 201 determines that the IP address for use in the infrastructure connection mode is not decided (NO in step S301), the processing proceeds to step S304. If the CPU 201 determines that the IP address for use in the infrastructure connection mode is already decided (YES in step S301), the processing proceeds to step S302.

In step S302, the CPU 201 determines whether the IP address for use in the infrastructure connection mode and the IP address for use in the direct connection mode overlap each other. The IP address for use in the direct connection mode is, for example, an IP address set by an administrator user in a setting screen (not illustrated). An IP address includes a network part and a host part, and an overlap between IP addresses indicates a state where the network parts of the IP addresses are identical to each other. If the CPU 201 determines that the IP address for use in the infrastructure connection mode and the IP address for use in the direct connection mode overlap each other (YES in step S302), the processing proceeds to step S303. If the CPU 201 determines that the IP address for use in the infrastructure connection mode and the IP address for use in the direct connection mode do not overlap each other (NO in step S302), the processing proceeds to step S304.

In step S304, the CPU 201 controls the operation unit 205 to activate a start button and display a direct connection screen. The screen displayed here is the direct connection screen 410 illustrated in FIG. 4B. Execution of the process in step S304 indicates that the printing apparatus 100 is operating in the infrastructure connection mode, or the IP address for use in the infrastructure connection mode and the IP address for use in the direct connection mode do not overlap each other. The printing apparatus 100 starts to operate in the direct connection mode without causing any issues. For this reason, the start button 411 is activated and displayed. The process to "activate the start button" indicates that the user can press the start button 411, and that the printing apparatus 100 starts to operate in the direct connection mode when the user presses the start button 411. When the user presses the start button 411, the printing apparatus 100 starts to operate in the direct connection mode, and awaits a request for wireless connection from the mobile terminal.

Next, in step S303, the CPU 201 controls the operation unit 205 to deactivate the start button and display a direct connection screen. The screen displayed here is a direct connection screen 430 illustrated in FIG. 4D. The start button is not included in the direct connection screen 430, unlike the direct connection screen 410. The process to "deactivate the start button" indicates that the start button is not displayed. The printing apparatus 100 can be prohibited from starting to operate in the direct connection mode by not displaying the start button. The direct connection screen 430 includes an error message 431 that prompts the user to review network setting of the printing apparatus 100. The error message 431 enables the user to know the reason why the printing apparatus cannot start to operate in the direct connection mode. The error message 431 enables the user to change IP address setting of the printing apparatus 100 so that the printing apparatus can start to operate in the direct connection mode.

Figure 4E:
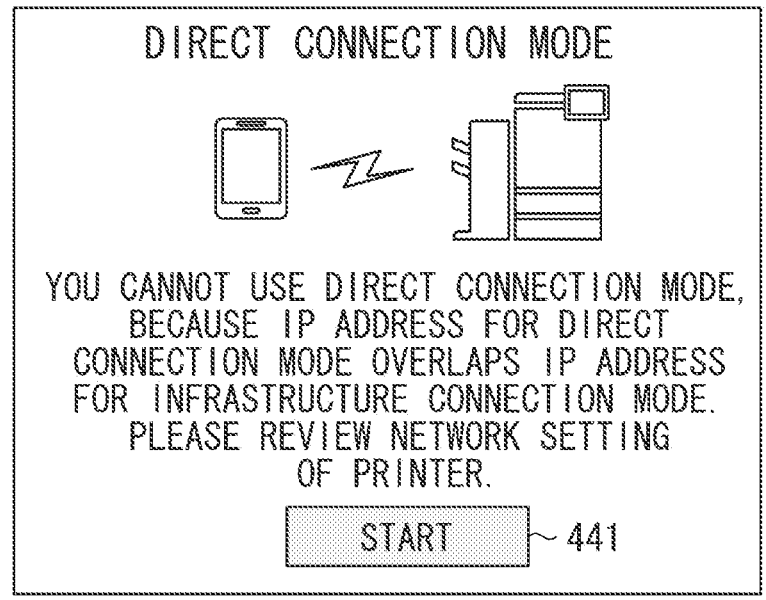

The process to "deactivate the start button" is not limited to bringing the start button into non-display. The process to "deactivate the start button" includes, for example, a case where the printing apparatus 100 does not start to operate in the direct connection mode even if the user presses this start button while the start button is being displayed. A direct connection screen 440 illustrated in FIG. 4E represents a specific example of this case. A start button 441 is displayed on the direct connection screen 440. However, the printing apparatus 100 does not start to operate in the direct connection mode, even if the user presses the start button 441. The start button 441 is displayed in a manner (e.g., gray-out display) different from the start button 411.

Figure 4F:
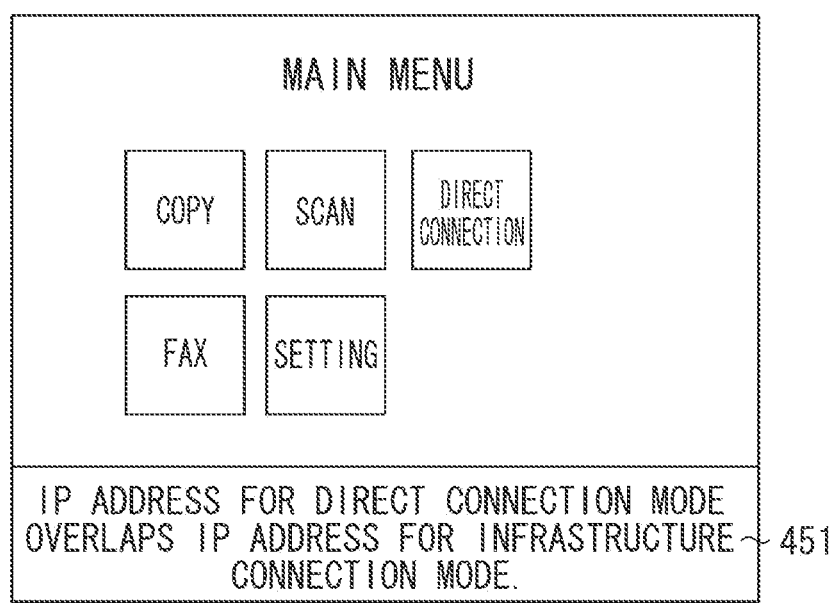

The user can be notified of the overlap between the IP address for use in the infrastructure connection mode and the IP address for use in the direct connection mode in a menu screen. A menu screen 450 illustrated in FIG. 4F is a screen displayed by the operation unit 205 in a case where the address for use in the infrastructure connection mode and the IP address for use in the direct connection mode overlap each other. An area 451 displays an error message that notifies the user of the occurrence of the overlap between the IP addresses.

The printing apparatus 100 of the present exemplary embodiment receives an instruction for starting to operate in the direct connection mode from the mobile terminal via the short-range wireless communication. Processing that is executed by the printing apparatus 100 will be described with reference to a flowchart in FIG. 5. The CPU 201 loads a control program stored in the ROM 202 into the RAM 203, and executes the loaded control program, thereby performing steps in the flowchart illustrated in FIG. 5. The processing of the flowchart in FIG. 5 is executed when the short range wireless communication unit 210 receives the instruction for starting to operate in the direct connection mode from the mobile terminal. The short-range wireless communication is not limited to Bluetooth®, and can be near field communication (NFC).

First, in step S501, the CPU 201 determines whether the IP address for use in the infrastructure connection mode is decided. The process executed in step S501 is similar to the above-described process in step S301 of FIG. 3. If the CPU 201 determines that the IP address for use in the infrastructure connection mode is not decided (NO in step S501), the processing proceeds to step S503. If the CPU 201 determines that the IP address for use in the infrastructure connection mode is decided (YES in step S501), the processing proceeds to step S502.

In step S502, the CPU 201 determines whether the IP address for use in the infrastructure connection mode and the IP address for use in the direct connection mode overlap each other. The process executed in step S502 is similar to the above-described process in step S302 of FIG. 3. If the CPU 201 determines that the IP address for use in the infrastructure connection mode and the IP address for use in the direct connection mode do not overlap each other (NO in step S502), the processing proceeds to step S503. In step S503, the CPU 201 starts to operate in the direct connection mode, based on the received start instruction.

If the CPU 201 determines that the IP address for use in the infrastructure connection mode and the IP address for use in the direct connection mode overlap each other (YES in step S502), the processing ends without starting to operate in the direct connection mode. This can prohibit the printing apparatus 100 from starting to operate in the direct connection mode, in a case where the IP address for use in the infrastructure connection mode and the IP address for use in the direct connection mode overlap each other.

There is a case where the IP address for use in the infrastructure connection mode is changed after the printing apparatus 100 starts to operate in the direct connection mode once. Processing to be executed by the printing apparatus 100 in this case will be described with reference to a flowchart in FIG. 6. The CPU 201 loads a control program stored in the ROM 202 into the RAM 203, and executes the loaded control program, thereby performing steps in the flowchart illustrated in FIG. 6. The processing of the flowchart in FIG. 6 is executed when the IP address for use in the infrastructure connection mode is changed.

First, in step S601, the CPU 201 determines whether the printing apparatus 100 is operating in the direct connection mode. If the CPU 201 determines that the printing apparatus 100 is not operating in the direct connection mode (No in step S601), the processing of the flowchart ends. If the CPU 201 determines that the printing apparatus 100 is operating in the direct connection mode (YES in step S601), the processing proceeds to step S602.

In step S602, the CPU 201 determines whether the IP address for use in the infrastructure connection mode and the IP address for use in the direct connection mode overlap each other. Because the IP address for use in the infrastructure connection mode has been changed, the CPU 201 reconfirms whether the IP addresses overlap each other. The process executed in step S602 is similar to the above-described process in step S302 of FIG. 3. If the CPU 201 determines that the IP address for use in the infrastructure connection mode and the IP address for use in the direct connection mode do not overlap each other (NO in step S602), the processing of the flowchart ends. The printing apparatus 100 then continues to operate in the direct connection mode.

If the CPU 201 determines that the IP address for use in the infrastructure connection mode and the IP address for use in the direct connection mode overlap each other (YES in step S602), the processing proceeds to step S603. In step S603, the CPU 201 stops operating in the direct connection mode. The printing apparatus 100 stops operating in the direct connection mode because the IP address for use in the infrastructure connection mode has been changed, and the IP address after the change and the IP address for use in the direct connection mode overlap each other.

As described above, according to the present exemplary embodiment, the printing apparatus 100 can be prohibited from operating in the direct connection mode in a case where the IP address for use in the infrastructure connection mode and the IP address for use in the direct connection mode overlap each other.

A second exemplary embodiment will be described as a modification of the first exemplary embodiment. The printing apparatus 100 of the second exemplary embodiment includes a characteristic of notifying the user that the IP address for use in the infrastructure connection mode and the IP address for use in the direct connection mode overlap each other when the start button of the direct connection mode is pressed by the user. This characteristic will be described in detail with reference to FIG. 7 and FIGS. 8A to 8D.

Figure 8A:
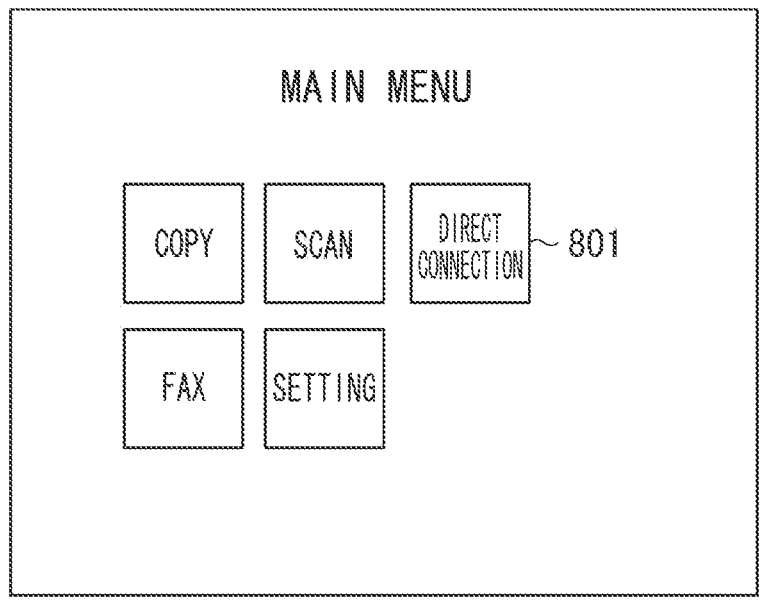
FIGS. 8A to 8D are diagrams each illustrating a screen to be displayed by the printing apparatus.
Figure 8B:
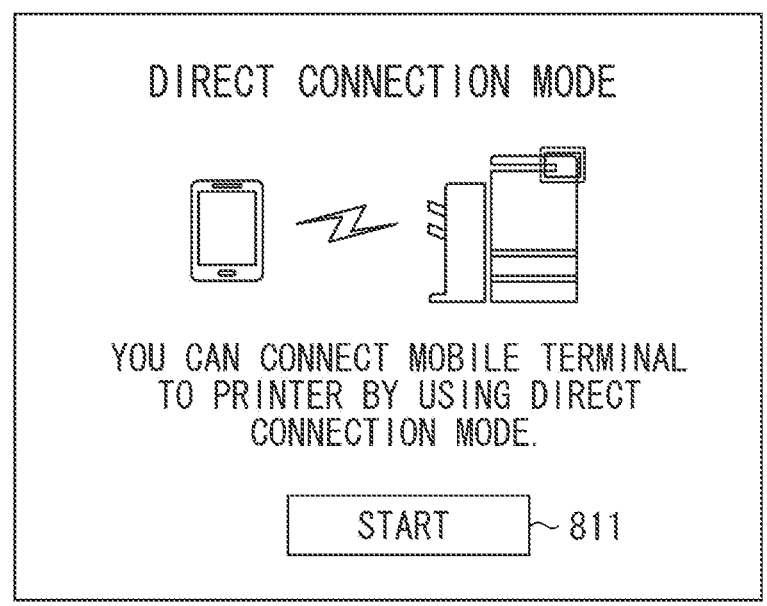
Figure 8C:
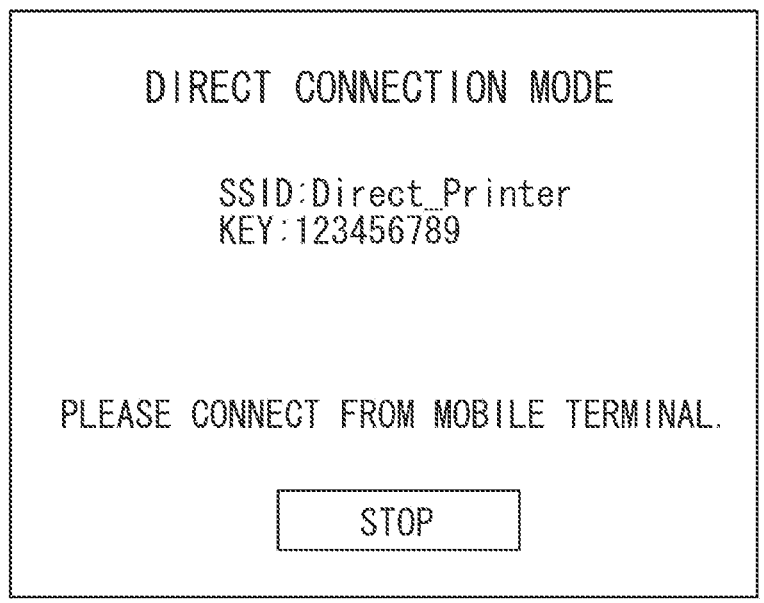

A menu screen 800 in FIG. 8A is a screen displayed by the operation unit 205 of the printing apparatus 100. The menu screen 800 is a screen enabling the user to select a desired function, as with the menu screen 400 illustrated in FIG. 4A. For example, presume that the user wishes to connect the user's mobile terminal to the printing apparatus 100 using the direct connection mode. In this case, the user presses an icon 801 on the menu screen 800. When the user presses the icon 801, the operation unit 205 displays a direct connection screen 810 illustrated in FIG. 8B. As with the direct connection screen 410 illustrated in FIG. 4B, the direct connection screen 810 in FIG. 8B includes a start button 811 enabling the user to instruct the printing apparatus to start to operate in the direct connection mode.

Figure 7:
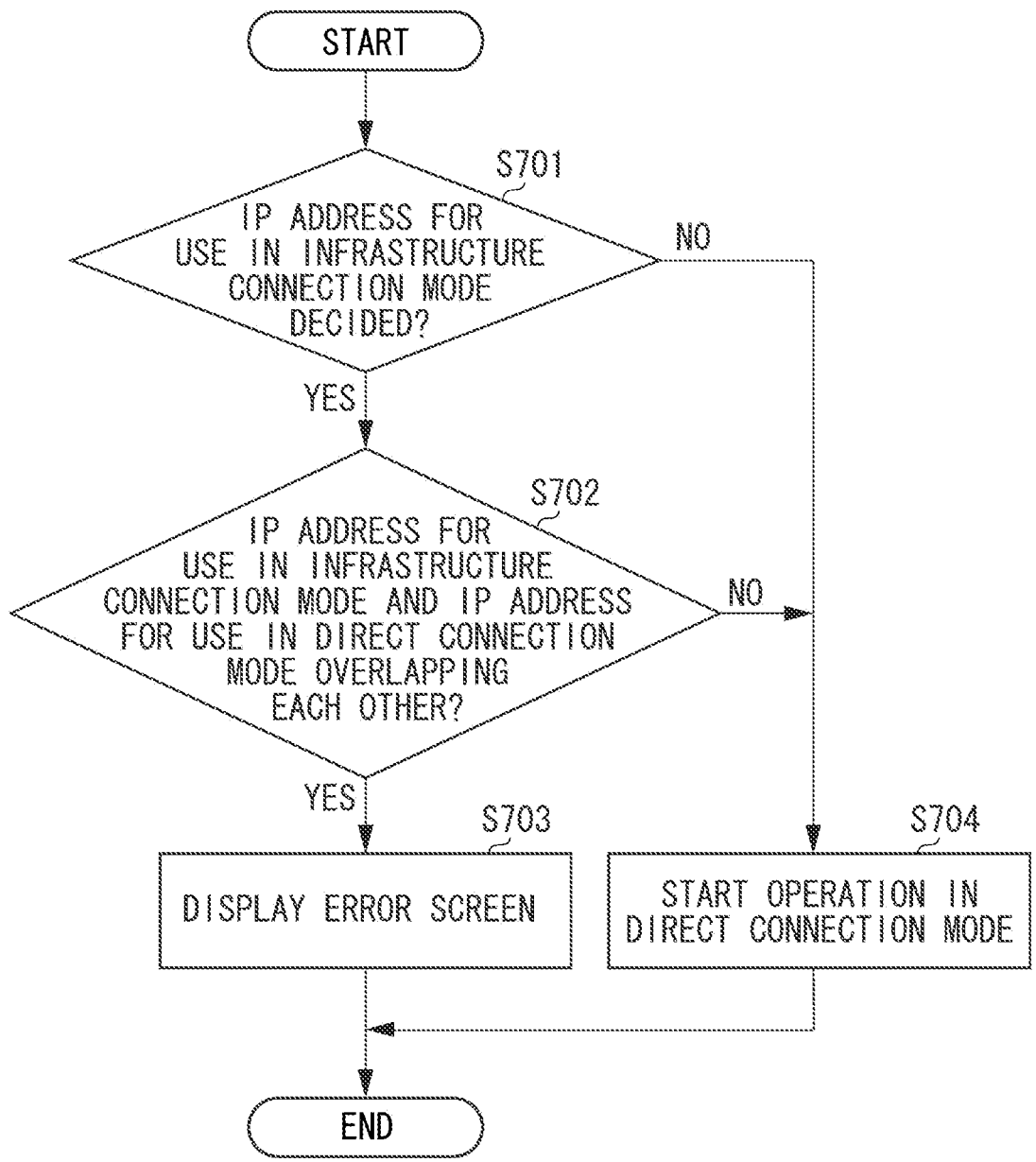
FIG. 7 is a flowchart illustrating processing to be executed by the printing apparatus.

Processing to be executed by the printing apparatus 100 when the user presses the start button 811 will be described with reference to a flowchart in FIG. 7. The CPU 201 loads a control program stored in the ROM 202 into the RAM 203, and executes the loaded control program, thereby performing steps in the flowchart illustrated in FIG. 7.

First, in step S701, the CPU 201 determines whether the IP address for use in the infrastructure connection mode is decided. The process executed in step S701 is similar to the above-described process in step S301 of FIG. 3. If the CPU 201 determines that the IP address for use in the infrastructure connection mode is not decided (NO in step S701), the processing proceeds to step S704. If the CPU 201 determines that the IP address for use in the infrastructure connection mode is decided (YES in step S701), the processing proceeds to step S702.

In step S702, the CPU 201 determines whether the IP address for use in the infrastructure connection mode and the IP address for use in the direct connection mode overlap each other. The process executed in step S702 is similar to the above-described process in step S302 of FIG. 3. If the CPU 201 determines that the IP address for use in the infrastructure connection mode and the IP address for use in the direct connection mode overlap each other (YES in step S702), the processing proceeds to step S703. If the CPU 201 determines that the IP address for use in the infrastructure connection mode and the IP address for use in the direct connection mode do not overlap each other (NO in step S702), the processing proceeds to step S704.

In step S704, the CPU 201 starts to operate in the direct connection mode. In this process, the operation unit 205 displays a direct connection screen 820 in FIG. 8C. Because the IP address for use in the infrastructure connection mode and the IP address for use in the direct connection mode do not overlap each other, the printing apparatus 100 can operate in the direct connection mode.

Figure 8D:
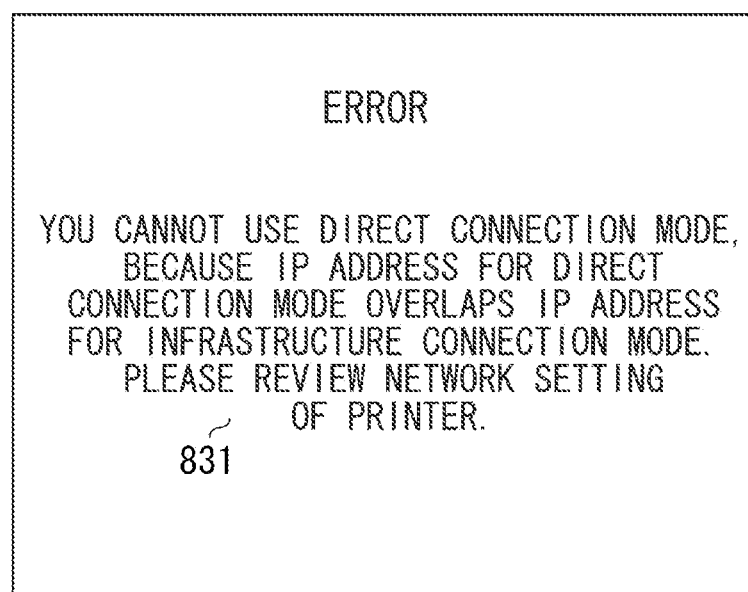

Next, in step S703, the CPU 201 displays an error screen. Because the IP address for use in the infrastructure connection mode and the IP address for use in the direct connection mode overlap each other, the printing apparatus 100 is prohibited from operating in the direct connection mode. An error screen 830 in FIG. 8D is the screen displayed by the operation unit 205 in step S703. The error screen 830 includes an error message 831 prompting the user to review the network setting of the printing apparatus 100.

As described above, according to the present exemplary embodiment, the printing apparatus 100 can be prohibited from operating in the direct connection mode in a case where the IP address for use in the infrastructure connection mode and the IP address for use in the direct connection mode overlap each other.

In the above-described exemplary embodiments, the printing apparatus is described as an example of the information processing apparatus that operates in the infrastructure connection mode and the direct connection mode. However, other apparatus types, such as a personal computer (PC), are applicable.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-051075, filed Mar. 16, 2017, which is hereby incorporated by reference herein in its entirety.

What is claimed is:

1. An information processing apparatus having an access point mode and an infrastructure communication mode, the access point mode being a mode of causing the information processing apparatus to function itself as an access point and performing direct wireless communication with an external apparatus via the access point without going through an external access point, the infrastructure communication mode being a mode in which the information processing apparatus gets connected to an external network, the information processing apparatus comprising:

at least one memory that stores a set of instructions; and at least one processor that executes the instructions to cause the information processing apparatus to perform operations comprising:

setting an operating setting relating to an Internet Protocol (IP) address used in the access point mode based on an operation by a user who has administrator authority;

determining whether a first network part corresponding to a first IP address in use in the infrastructure communication mode matches with a second network part corresponding to a second IP address that is decided to be used in the access point mode, based on the operation setting, before the information processing apparatus is caused to function itself as the access point used in the access point mode;

wherein whether to prohibit the information processing apparatus from functioning itself as the access point or permit the information processing apparatus to function itself as the access point depends on a result of the determination, wherein, based on an operation by a general user who does not have the administrator authority, changing the operating setting relating to the IP address used in the access point mode is not permitted.

2. The information processing apparatus according to claim 1, wherein, the operations further comprising:

performing control to display a first screen including a display object for receiving an operation for starting the direct wireless communication mode on a display device in a case where it is determined that the first network part does not match with the second network part and a user operation for displaying a screen related to the access point mode is received; and performing control to display a second screen including an error message but not including the display object on the display device in a case where it is determined that the first network part matches with the second network part and the user operation for displaying the screen related to the access point mode is received, wherein the information processing apparatus starts to operate in the access point mode according to reception of a user operation on the display object.

3. The information processing apparatus according to claim 2, wherein the error message is a message prompting the user to review network setting of the information processing apparatus and wherein the second screen does not include a display item for displaying the operating setting relating to the IP address used in the access point mode.

4. The information processing apparatus according to claim 1, further comprising a short range wireless communication unit, wherein, in a case where it is determined that the first network part does not match with the second network part and in a state where the information processing apparatus is not operating in the access point mode, control the information processing apparatus to start operating in the access point mode in response to the short range wireless communication unit receiving an instruction to cause the information processing apparatus to start operation in the access point mode from an external apparatus, and wherein, in a case where it is determined that the first network part matches with the second network part, the information processing apparatus does not start operating in the access point mode, even when the short range wireless communication unit receives the instruction to cause the information processing apparatus to start operation in the access point mode from the external apparatus.

5. The information processing apparatus according to claim 4, wherein the short range wireless communication unit receives the instruction to cause the information processing apparatus to start operation in the access point mode from the external apparatus via Bluetooth® or near field communication (NFC).

6. The information processing apparatus according to claim 1, wherein the at least one processor that executes the instructions to cause the information processing apparatus to perform further operations comprising:

when an IP address for use in the infrastructure communication mode is changed from the first IP address to a third IP address in a state where the information processing apparatus is caused to function itself as the access point used in the access point mode, whether a third network part of the third IP address matches with a forth network part of a forth IP address that is used by the access point, and controlling to stop causing the information processing apparatus to function itself as the access point, in response it being determined to that the third network part matches with the forth network part.

7. The information processing apparatus according to claim 1, wherein the information processing apparatus is a printing apparatus.

8. A control method implemented by at least one processor for controlling an information processing apparatus having an access point mode and an infrastructure communication mode, the access point mode being a mode of causing the information processing apparatus to function itself as an access point and performing direct wireless communication with an external apparatus via the access point without going through an external access point, the infrastructure communication mode being a mode in which the information processing apparatus gets connected to an external network, the control method comprising:

setting, by the at least one processor an operating setting relating to an internet protocol (IP) address used in the access point mode based on an operation by a user who has administrator authority;

determining, by the at least one processor, whether a first network part corresponding to a first IP address in use in the infrastructure communication mode matches with a second network park corresponding to a second IP address that is decided to be used the access point mode based on the operation setting before the information processing apparatus is caused to function itself as the access point used in the access point mode; and wherein whether to prohibit the information processing apparatus from functioning itself as the access point or permit the information processing apparatus to function itself as the access point depends on a result of the determination, wherein, based on an operation by a general user who does not have the administrator authority, changing the operating setting relating to the IF address used in the access point mode is not permitted.

9. A non-transitory computer-readable storage medium storing a program for causing a computer to execute a control method implemented by at least one processor, for controlling an information processing apparatus having an access point mode and an infrastructure communication mode, the access point mode being a mode of causing the information processing apparatus to function itself as an access point and performing direct wireless communication with an external apparatus via the access point without going through an external access point, the infrastructure communication mode being a mode in which the information processing apparatus gets connected to an external network, the control method comprising:

setting, by the at least one processor, an operating setting relating to an internet protocol (IP) address used in the access point mode based on an operation by a user who has administrator authority;

determining, by the at least one processor, whether a first network part corresponding to a first IP address in use in the infrastructure communication mode matches with a second network park corresponding to a second IP address that is decided to be used the access point mode based on the operation setting before the information processing apparatus is caused to function itself as the access point used in the access point mode; and wherein whether to prohibit the information processing apparatus from functioning itself as the access point or permit the information processing apparatus to function itself as the access point depends on a result of the determination, wherein, based on an operation by a general user who does not have the administrator authority, changing the operating setting relating to the IP address used in the access point mode is not permitted.

\* \* \* \* \*